June 29, 1926.

T. J. KELLY

HEATING DEVICE

Filed Nov. 28, 1925

1,590,948

Inventor
Thomas J. Kelly.

By
Attorney

Patented June 29, 1926.

1,590,948

UNITED STATES PATENT OFFICE.

THOMAS J. KELLY, OF VIRGINIA, MINNESOTA.

HEATING DEVICE.

Application filed November 28, 1925. Serial No. 71,980.

This invention relates to new and useful improvements in heating devices, and particularly to devices for use in connection with coal or gas stoves.

One object of the invention is to provide a device which is adapted to be placed on or over a stove, and which will discharge heated air out into a room, whereby to increase the heating capacity of the stove, without the expenditure of additional fuel.

Another object is to provide a device of this character by means of which the colder air, near the floor of a room may be passed over a source of heat, such as the flame of a gas stove, or top of a coal stove, and discharged into the air of the room to raise the temperature thereof.

Other objects and advantages will be apparent from the following descripton when taken in connection with the accompanying drawing.

In the drawing:—

Figure 1:
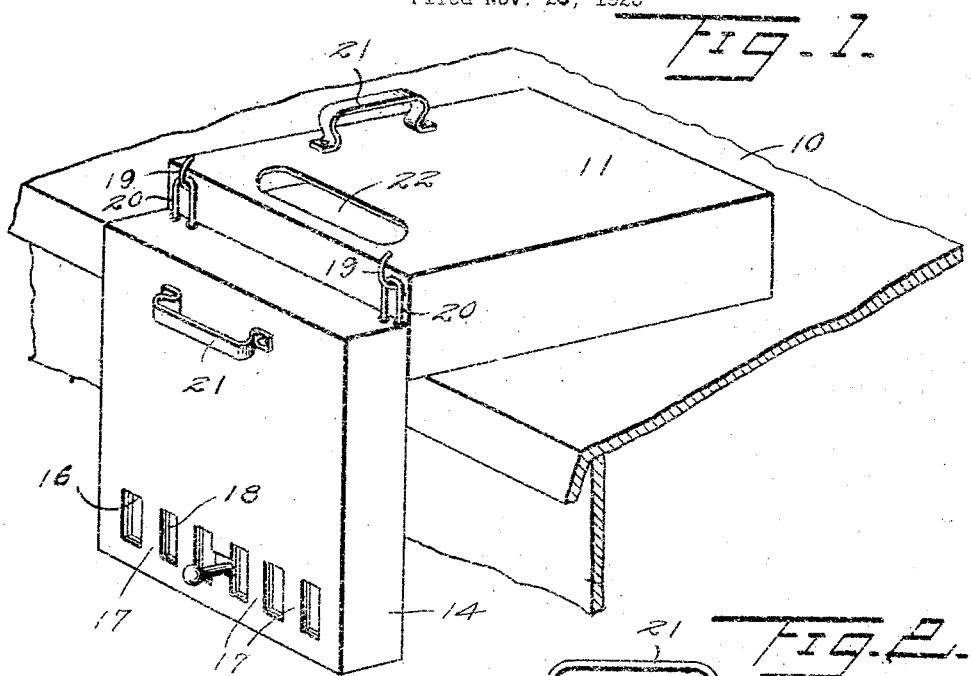
Figure 1 is a perspective view of the invention shown in connection with a portion of a stove.
Figure 2:
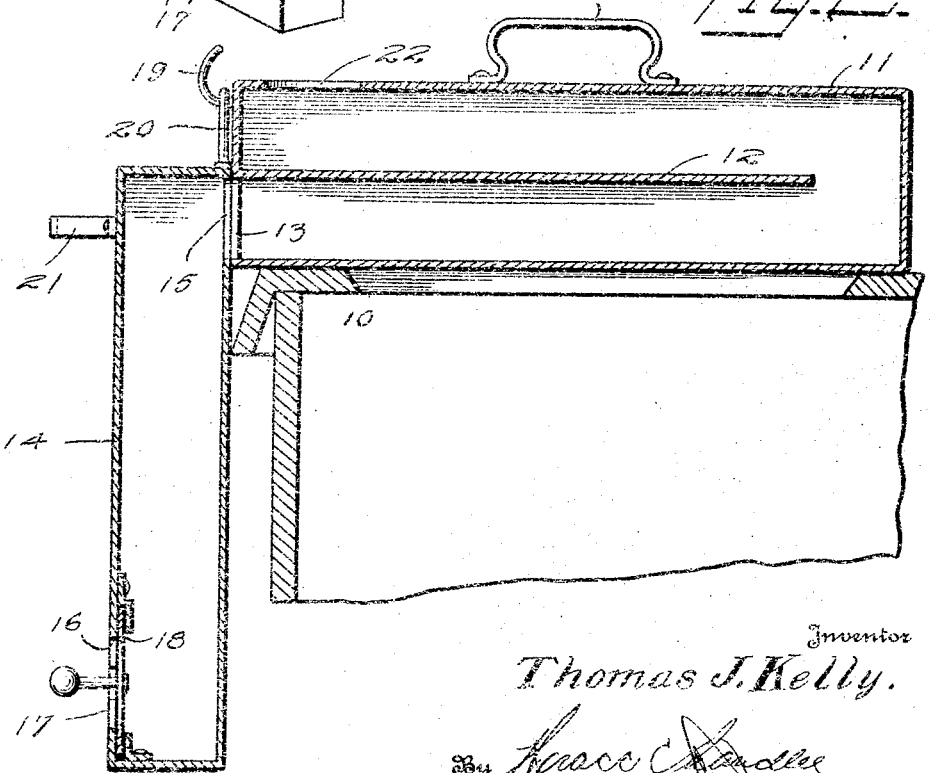
Figure 2 is an enlarged vertical sectional view through the device.

Referring particularly to the accompanying drawing, 10 represents a portion of the top of a coal range, in connection with which the present invention is used. Disposed on the top of the stove, in horizontal position, is a rectangular casing 11, which is divided longitudinally and horizontally by the partition 12, said partition being connected with the side walls and one end of the casing, and having its other end spaced from the other end of the casing. In the end wall of the casing, beneath the attached end of the partition 12, is an elongated opening 13, and connected to this end of the casing, in covering relation to said opening, is a right angularly extending casing 14, said latter casing having an opening 15 registering with the opening 13. In the lower portion of the outer vertical wall of the casing 14 there is a transverse elongated opening 16 having regularly spaced vertical bars 17, behind which is slidably disposed the damper plate 18, which latter has similar bars and openings adapted to cover and uncover the first openings to regulate the amount of air entering the casing 14. The casing 11 has the hooks 19 on its outer end for engagement by loops 20 carried by the upper end of the casing 14, and each of the casings 11 and 14 is provided with a suitable handle 21.

In the upper wall of the casing 11, above the attached end of the partition 12, there is formed an elongated hot air escape opening 22.

The device being properly disposed on the stove, as indicated in Figure 1, the casing 11 will become heated, and cold air will enter the regulated openings in the lower end of the casing 14, pass into the casing 11, beneath the partition 12, upwardly past the unattached end of said partition, back again, over the partition, and out through the opening 22. The air, as it passes beneath and over the partition 12 becomes highly heated, and escapes into the room to raise the temperature of the air thereof.

While the device is shown in connection with a coal stove, it will be readily understood that the casing 11 may be placed over the burner of a gas stove, to accomplish the same result.

What is claimed is:

1. An air heating device comprising a pair of angularly connected casings, one of the casings being arranged to be placed over a source of heat and having a tortuous passage therein and an outlet opening in the top thereof, the other casing connected with the first casing for conducting cold air from a level below the first casing into said first casing, and means in the second casing for regulating the entrance of cold air.

2. An air heating device comprising a casing having a tortuous passage therein and openings at the respective ends of said passage and adapted to be placed over a source of heat, and a second casing connected with the first casing in covering relation to one of said openings for conveying cold air to said first casing from a level below said first casing.

3. An air heating device comprising a horizontal casing having a tortuous passage therein with openings at the respective ends of said passage, one of the openings being formed in one end of the casing and the other opening being formed in the upper wall thereof, a second casing disposed at right angles to the first casing and having an opening registering with the first-named opening of the first casing, said second casing opening being adjacent one end thereof, and means in the second casing adjacent the other end thereof for regulating the flow of air into said casing.

In testimony whereof, I affix my signature.

THOMAS J. KELLY.